United States Patent
Balasubramaniam et al.

(10) Patent No.: US 6,359,633 B1
(45) Date of Patent: Mar. 19, 2002

(54) APPARATUS AND METHOD FOR ABSTRACTING MARKUP LANGUAGE DOCUMENTS

(75) Inventors: Shanmugasunder Balasubramaniam, Santa Clara; Mohan Vishwanath, San Jose; Anurag Mendhekar, Sunnyvale, all of CA (US)

(73) Assignee: Yahoo! Inc., Santa Clara, CA (US)

( * ) Notice: Subject to any disclaimer, the term of this patent is extended or adjusted under 35 U.S.C. 154(b) by 0 days.

(21) Appl. No.: 09/232,117

(22) Filed: Jan. 15, 1999

(51) Int. Cl.[7] .................................................. G06F 3/00

(52) U.S. Cl. .................... 345/760; 345/853; 345/855; 345/738; 707/513; 707/501.1

(58) Field of Search ................................. 345/329, 357, 345/333, 733, 854, 762, 760, 853, 855; 707/513, 501.1, 501; 709/217, 219

(56) References Cited

U.S. PATENT DOCUMENTS

| | | | | |
|---|---|---|---|---|
| 5,708,825 A | * | 1/1998 | Sotomayor | 707/501 |
| 5,727,159 A | | 3/1998 | Kikinis | 395/200.76 |
| 5,870,559 A | * | 2/1999 | Leshem et al. | 709/224 |
| 5,913,215 A | * | 6/1999 | Rubinstein et al. | 707/10 |
| 5,963,208 A | * | 10/1999 | Dolen et al. | 345/357 |
| 6,035,330 A | * | 3/2000 | Astiz et al. | 709/218 |
| 6,085,161 A | * | 7/2000 | MacKenty et al. | 704/270 |
| 6,112,212 A | * | 8/2000 | Heitler | 707/501 |

OTHER PUBLICATIONS

Bickmore, Timothy W., Schilit, Bill N., "Digestor: Device–Independent Access to the World Wide Web," Computer Networks and ISDN Systems, 1997, 1075–1082.

Johnson, D., "Converting PC GUIs for NonPC Devices," Circuit Cellur Ink, Feb. 1998, pp. 40–45.

Ian Cooper, Shufflebotham, R., "PDA Web Browsers: Implementation Issues," Nov. 1995, pp. 1–12.

* cited by examiner

Primary Examiner—John Cabeca
Assistant Examiner—Kieu D. Vu
(74) Attorney, Agent, or Firm—Fliesler, Dubb, Meyer & Lovejoy LLP

(57) ABSTRACT

An apparatus and a method to generate a hyperlinked abstract from a markup language document by parsing the document to create a syntax tree, analyzing statistically the syntax tree based on at least one rule, classifying information at each node of the syntax tree, adapting information at each node of the classified tree for outputting and summarizing the adapted tree to create a hyperlinked abstract of the document to be presented at an output device. The abstract can be considered as a summarized version of the document. It occupies less bandwidth than the document, allowing it to be transmitted to a user at a much faster pace, even if the user's computing system and connection are not very sophisticated. Through the abstract, the user can quickly become aware of the coverage of the document. If more detailed information is preferred, the user can access those materials in the document through hyperlinks. In one embodiment, the summarization step includes grouping, in which a pre-determined number of nodes are grouped together. In another embodiment, after summarization, the tree can be modified by an output-specific filter, and can be sent to an output device.

22 Claims, 6 Drawing Sheets

APPARATUS AND METHOD FOR ABSTRACTING MARKUP LANGUAGE DOCUMENTS

BACKGROUND OF THE INVENTION

The present invention relates generally to markup languages and more particularly to automatically abstracting markup language documents.

The explosion of incompatible non-PC devices that can access markup language documents from sources like the Internet has created tremendous opportunities and challenges. One of the reasons for the incompatibility of these devices arises from their diverse capabilities. For example, a network administrator might be accessing the content of a Web page with a technologically advanced server computer; while at the same time, a stock broker is accessing the same page with a pager having minimal computing power, not much memory and a low-resolution small screen. Both users have different needs and preferences, but are trying to get information from the same source using very different devices.

Not only devices have diverse capabilities and users have diverse interests, it is not uncommon for connections to the devices to have significantly different characteristics. The network administrator might be accessing the Web page through a T1 line, while the stock broker is accessing the page over the air at 14.4 Kbits per second.

Both the network administrator and the stock broker do not want to wait to find out that the information in the page is not what they are looking for. Both of them want to gain access instantaneously. This creates major problems for content providers, service providers and device manufacturers.

It should have been apparent from the foregoing that there is a need to quickly provide an indication regarding information in a Web page or other markup language documents. Time is of the essence. People with different interests using different types of devices and connections still want to access their desired information expediently.

SUMMARY OF THE INVENTION

The present invention provides methods and apparatus to automatically create a hyperlinked abstract of a markup language document. The abstract can be considered as a summarized version of the document. It occupies less bandwidth than the document, and can be transmitted to a user at a much faster pace, even if the user's computing system and connection are not very sophisticated. Through the abstract, the user can quickly become aware of the coverage of the document. If more detailed information is preferred, through hyperlinks, the user can access those materials in the document.

In one embodiment, the document is parsed to create a syntax tree, with one or more levels and one or more nodes at each level. Each node of the tree is analyzed statistically to collect information, which can be used to create an annotated syntax tree.

Based on the analysis, information at each node can be classified to create a classified tree. In one embodiment, a node can be in one of seven categories. Information at each classified node can also be represented in the syntax of a language that can be understood by an output device. Then, the tree is summarized.

The summarization step can be performed heuristically. One heuristic is based on an input from a user. Note that the heuristics can be embedded into software programs or hardware circuits.

In one embodiment, the summarization step includes grouping. The invention groups a predetermined number of nodes together, and may give this set of nodes a group-name. Due to grouping, the numbers of levels (renamed as group-levels) and nodes (renamed as group-nodes) in the tree are reduced. Each group encapsulates more information than those in each of its nodes.

This grouping process can depend on the output device and the connection to the output device. This grouping process can also depend on the class a node belongs to, and user preferences.

Moreover, across every group-level, each group-node should be of similar importance, such as the variance in size across group-nodes at a group-level is low. A high variance at a group-level can imply that at least one of the group-nodes is occupying significantly more space. That group-node can then be split into smaller group-nodes, which are considered to be at the same group-level as the original group-nodes with low variance. This can be done recursively until the variance among group-nodes at the group-level is low.

The summarized tree occupies less bandwidth than the original document. Transmitting the summarized tree to a user requires less bandwidth, and can quickly provide the user an indication regarding information in the document.

After summarization, the tree can be modified by an output-specific filter, and can then be sent to an output device. The output-specific filter can depend on the device, the connection to the device and the user preference.

Other aspects and advantages of the present invention will become apparent from the following detailed description, which, when taken in conjunction with the accompanying drawings, illustrates by way of example the principles of the invention.

Same numerals in FIGS. 1–9 are assigned to similar elements in all the figures. Embodiments of the invention are discussed below with reference to FIGS. 1–9. However, those skilled in the art will readily appreciate that the detailed description given herein with respect to these figures is for explanatory purposes as the invention extends beyond these limited embodiments.

DETAILED DESCRIPTION

Figure 1:
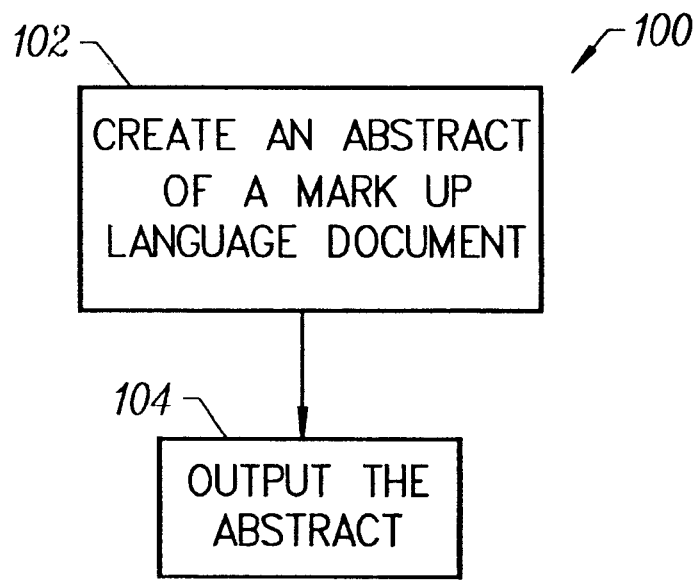
FIG. 1 shows one set of steps to implement one embodiment of the present invention.
Figure 2:
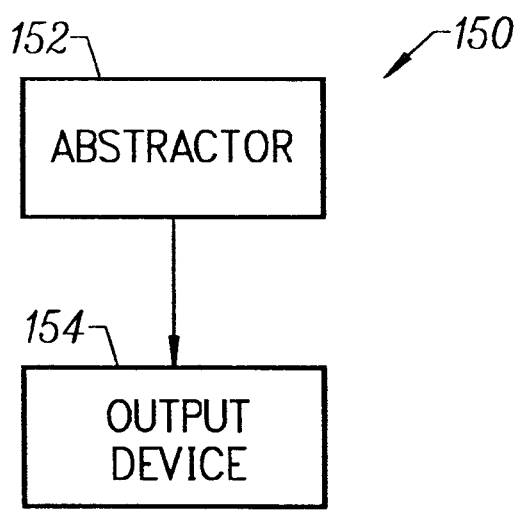
FIG. 2 shows one apparatus implementing the steps shown in FIG. 1.

FIG. 1 shows one set of steps 100 to implement one embodiment of the present invention. FIG. 2 shows one apparatus 150 to implement the set of steps shown in FIG. 1. First, an abstractor 152 can create (step 102) a hyperlinked abstract of a markup language document. The abstract can be considered as a summarized version of the document. Then an output device 154 outputs (step 104) the abstract.

In one embodiment, an abstract can be defined as follows: Given the same process and output device, the abstract will occupy less space or time (bandwidth) than the document. For example, if the output device is a speaker, the document might take 1 hour to be presented, while the abstract might just take 1 minute.

The abstract occupies less bandwidth than the document, allowing it to be transmitted to a user at a much faster pace, even if the user's computing system and connection are not very sophisticated. Through the abstract, the user can quickly become aware of the coverage of the document. If more detailed information is preferred, through hyperlinks, the user can access those materials in the document. Note that a hyperlink can connect a part of the document to another part of the same document.

In one embodiment, based on the abstract, one can always re-generate the content of the document, while information regarding the layout of the document might be lost. For example, the first line of the document might be in bold face; and in the abstract, the first line is represented by one word. Based on a hyperlink, the first line can be recreated from the word, but the fact that the first line in the original document was in boldface might be lost.

Figure 3:
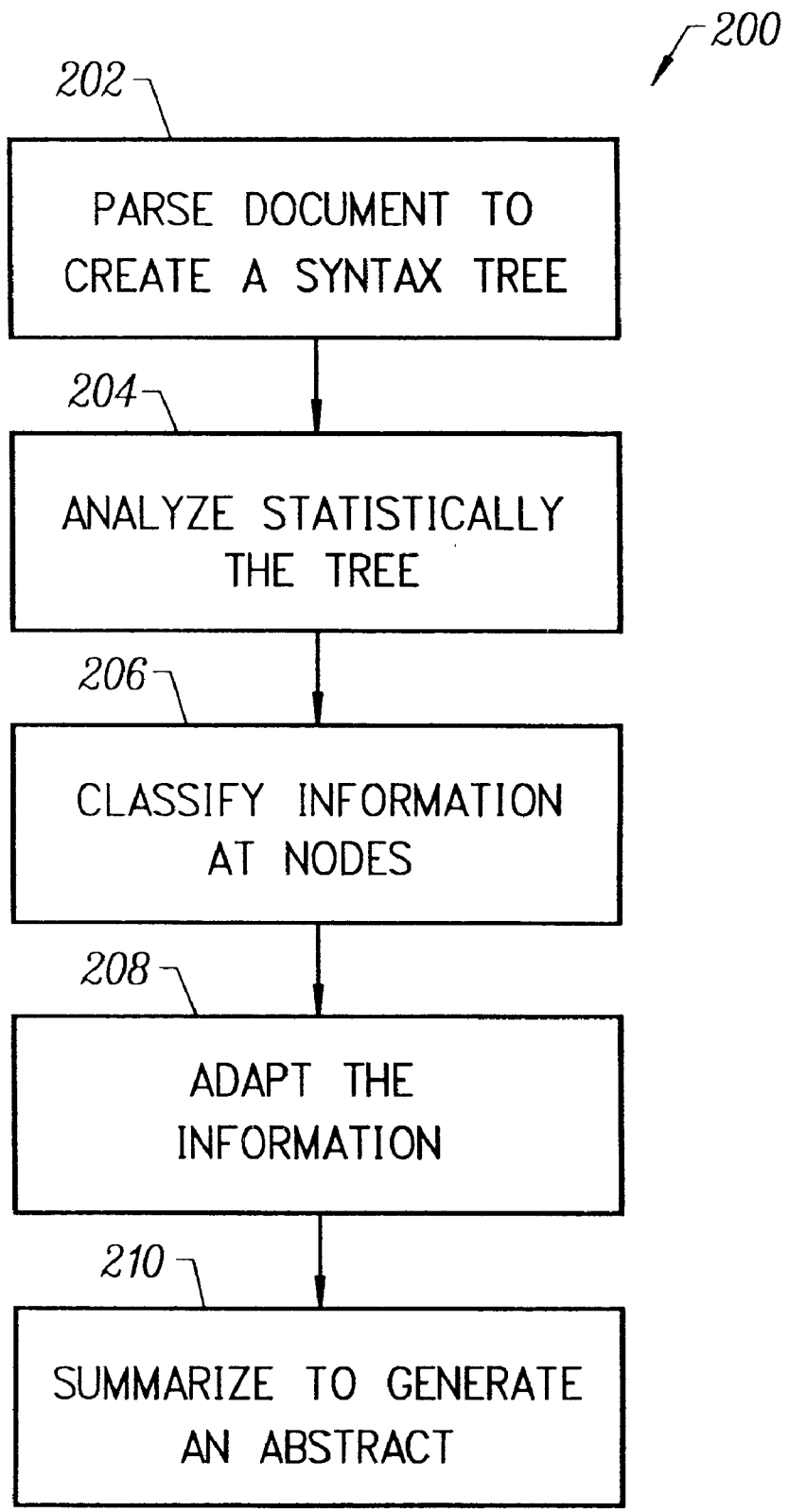
FIG. 3 shows one set of steps to implement an abstractor of the present invention.
Figure 4:
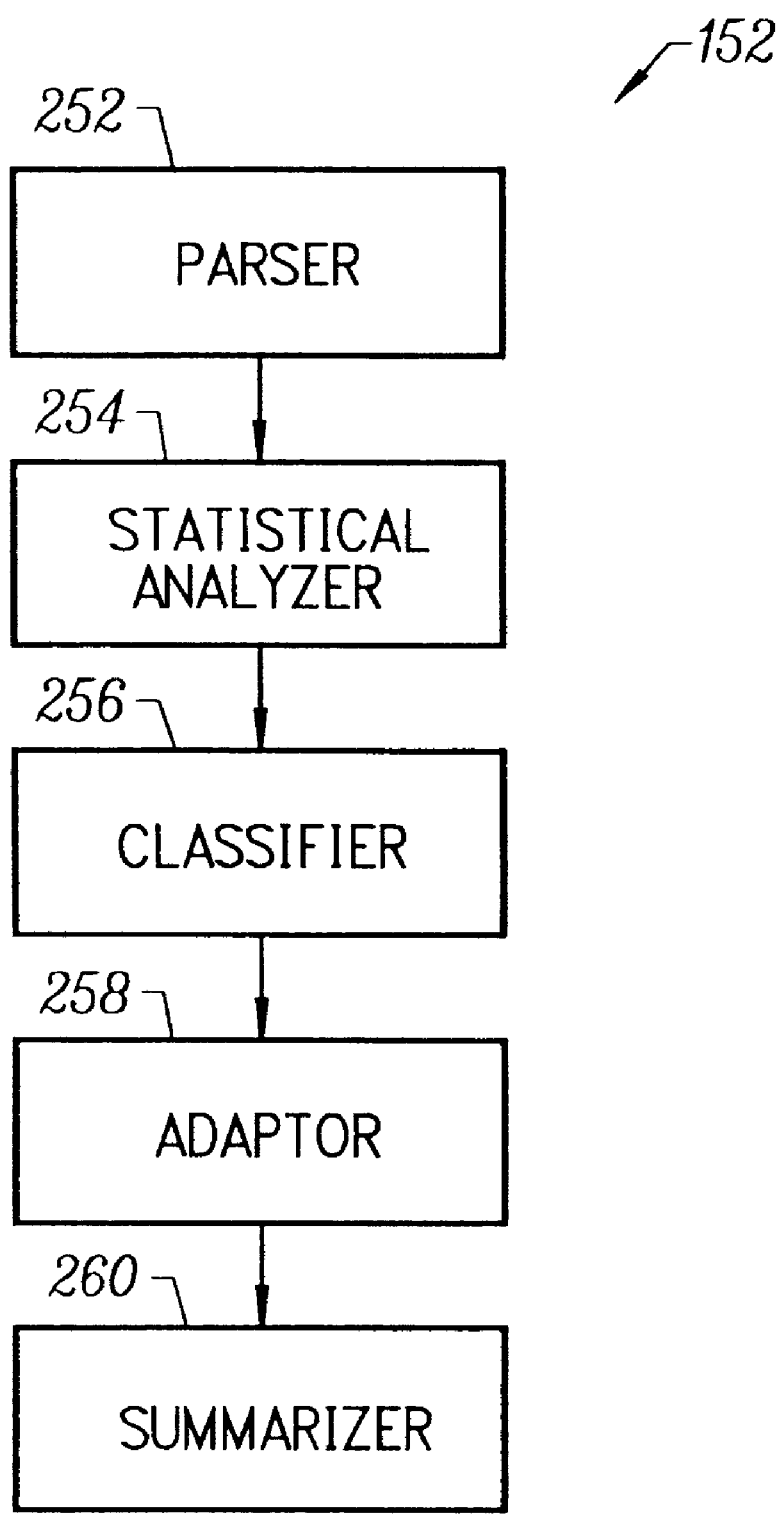
FIG. 4 shows a number of devices for an abstractor of the present invention.

FIG. 3 shows one set of steps 200 to implement an abstractor of the present invention. FIG. 4 shows a number of devices for an abstractor 152. In one embodiment, the document is parsed (step 202) by a parser 252 to create a syntax tree, with more than one levels and one or more nodes at each level. The syntax of the language of the document is known. For example, the markup language is HTML. Based on the syntax, the document is parsed. In one embodiment, each node of the tree represents one syntactic element of the markup language. For example, a node might represent a table with its content, or an address, such as a URL The process of parsing should be known to those skilled in the art, and will not be further described in the present invention.

Each node of the tree is then analyzed statistically (step 204) by a statistical analyzer 254 to collect information, which can be used to create an annotated syntax tree. The statistics at a node can include attributes of that node such as the size of its content, the number of URLs in the content, and whether the content is in plain text or not. The statistics of a node can also include a label for that node. In one embodiment, statistical analysis is done heuristically in the bottom-up manner, moving from children nodes to their parent node. Detailed mechanics of statistical analysis will not be not be discussed because this should be obvious to those skilled in the art.

As an example of a rule to label a node, one can select the data in the content of the node that has the largest font size and that is in boldface, and use that piece of data as the label or the name. Another example is that the content of the node includes a title, an image and a piece of text. One rule is to select the title to be the name of the node. An annotated syntax tree can then be created, with a name or label and its corresponding statistics for each node.

Figure 5:
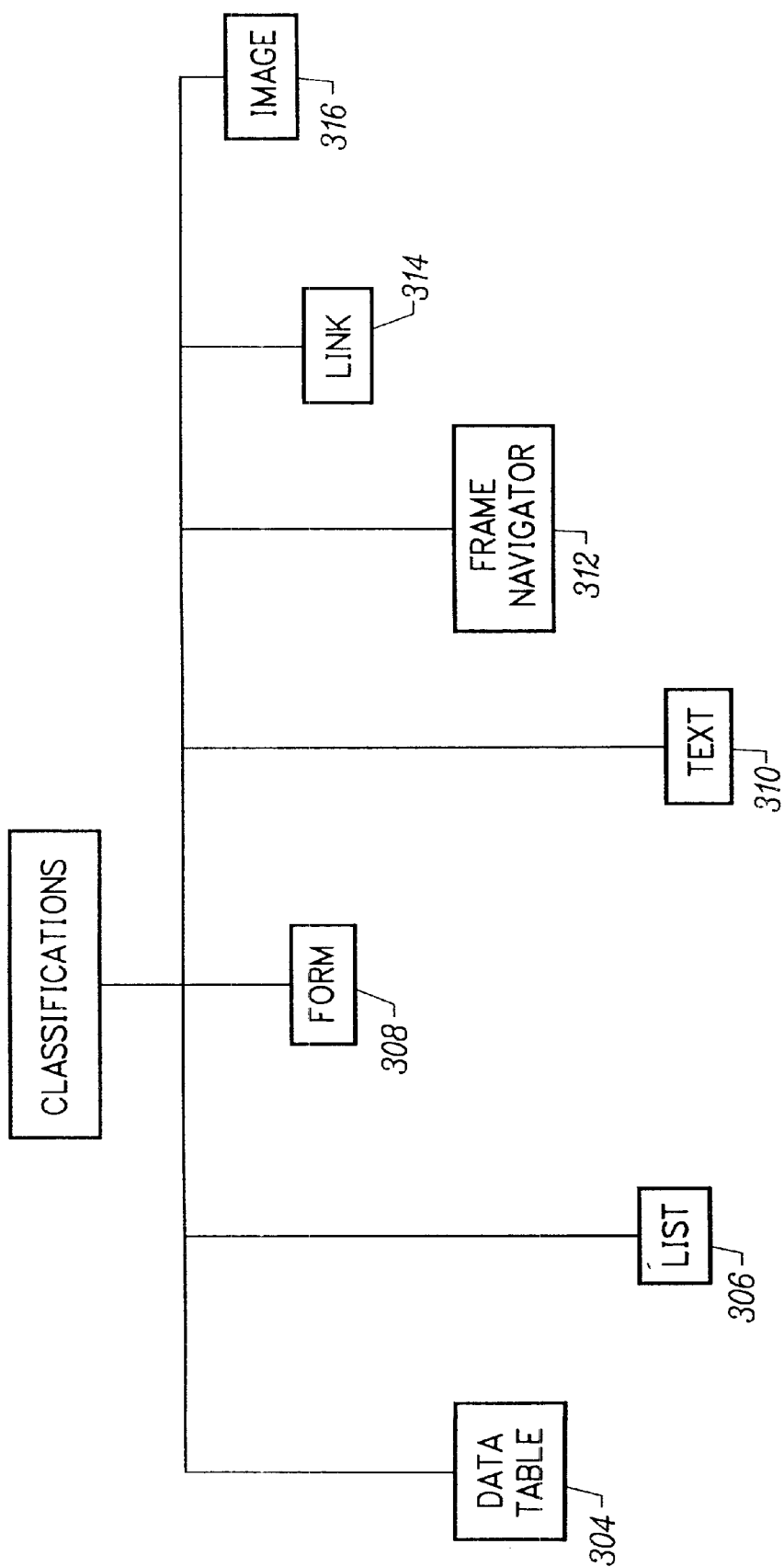
FIG. 5 shows a number of classifications for a node of the present invention.

In one embodiment, based on the analysis, a classifier 256 classifies (step 206) information at each node to create a classified tree. This can be done top-down based on the statistics at each of the nodes, from parent nodes to children nodes. In one embodiment, there are seven pre-defined categories or classifications as shown in FIG. 5; and they are Datatable 304, List 306, Form 308, Text 310, Frame Navigator 312, Link 314 and Image 316. In one embodiment, each of the categories is known as a UI element.

One example to define each of the categories is as follows:
1. Datatable—A table with most of its cells having similar amount of data.
2. List—A list of items, each of which is a Text or a Link UI element.
3. Form—A form is a collection of Text UI elements and elements which facilitate user inputs.
4. Text—A piece of formatted text.
5. Frame Navigator—A list of Links, each of which refers to a frame, e.g. HTML fiames.
6. Link—An address, such as a URL.
7. Image—A picture.

The statistics available in the annotated syntax tree are used to detect if a certain node can be classified as one of the categories. In one embodiment, the document is classified into the UI Elements. This classification process can be done from top-down. Each node is analyzed to determine if that node is an identifiable UI element. If it is not, its sub-nodes are analyzed. For example, if a node includes a piece of text and an image, that node can be classified as a Text UI element and an Image UI element. This can be done recursively. In one embodiment, classification continues until each of the nodes is an UI element. However, all of the UI elements, except plain texts with no formatting and plain images with no hyperlinks may be composed of two or more UI elements based on a set of rules. For example, one rule is that List can be composed of only Text and Link UI elements. In one embodiment, the classification process is accomplished when all of the nodes classified do not support any more nesting.

After the classification, in one embodiment, an adaptor 258 adapts (step 208) information at each classified node for the syntax of a language that can be understood by an output device. For example, the output can be in HTML for a personal computer, or the output can be in formatted text for a pager. The adaptor 258 adapts according to the output device. Methods to adapt information should be known to those skilled in the art, and will not be further described in the present description.

Figure 6:
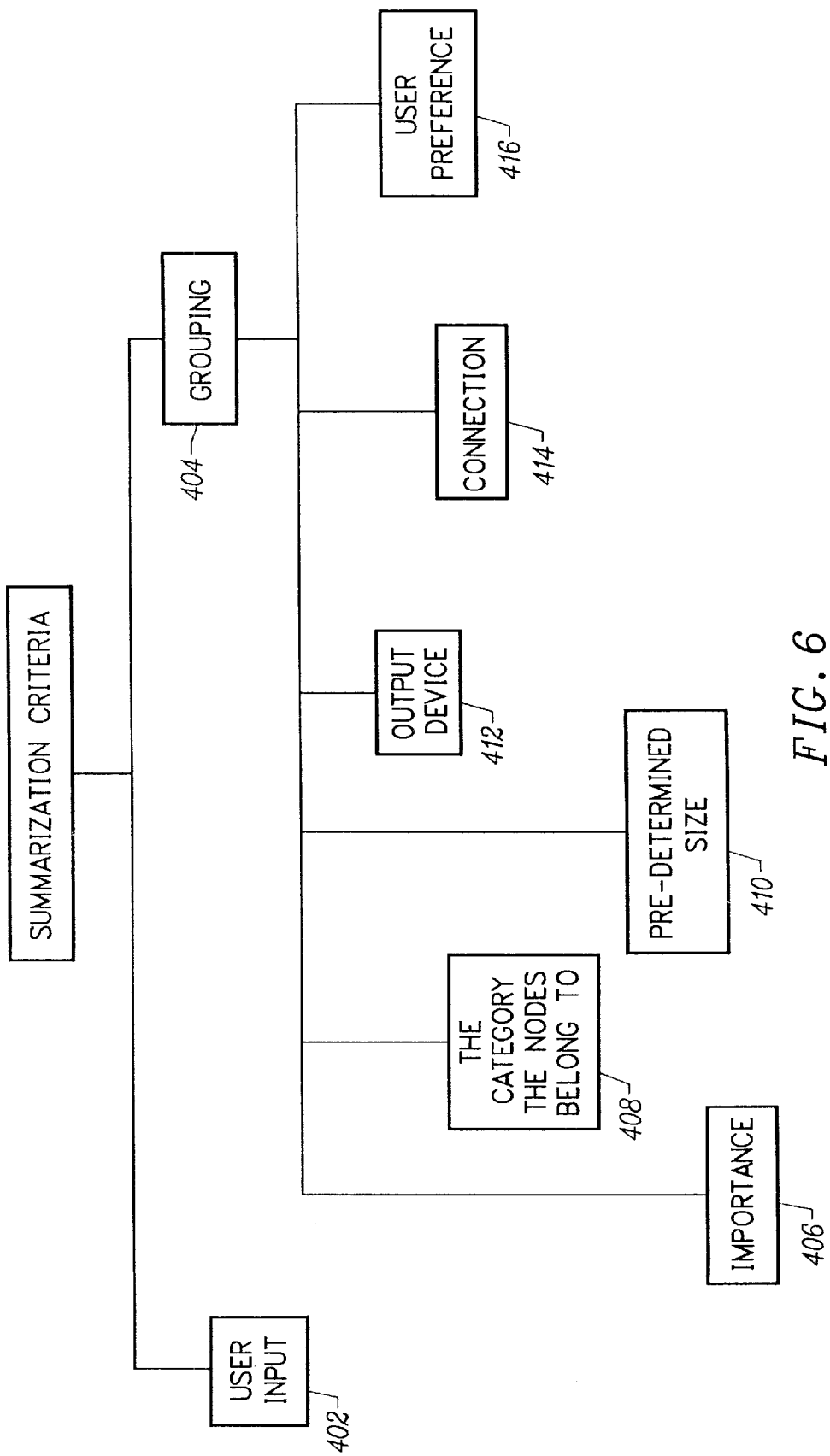
FIG. 6 shows a number of summarization criteria of the present invention.

Then, a summarizer 260 summarizes (step 210) the information. This can be performed heuristically. FIG. 6 shows a number of summarization criteria of the present invention. One heuristic or criterion is based on an input 402 from a user. For example, the user might just want to see her stock portfolio. Then, the summarization step drops every node in the classified tree, except the Datatable with information regarding stocks.

In one embodiment, the summarization step includes grouping 404 a pre-determined number of nodes with their corresponding contents, and may give this set of node a group-name. The grouping step can reduce the size of the tree so as it is reasonable to be presented at an output device based on some criteria. For example, if the output is a small device, after grouping, only the table of content of the document is left.

Due to grouping, the numbers of levels (renamed as group-levels) and nodes (renamed as group-nodes) in the tree are reduced.

The grouping process can be done top-down. In one embodiment, the number of nodes that are grouped is close to a pre-defined size limit, 410. One may not want to have too few or too many nodes at the end of the grouping step. Too few may imply the essence of the document has not been conveyed. For example, if only two nodes <LI> and <L> are grouped, such two nodes together may not be too informative. On the other hand, too many nodes grouped may imply that too much information has been tied together, and the group node may not be able to convey to a user generalized information regarding that node.

This grouping process can also depend on the output device 412, the output connection 414, the category the node belongs to 408, the preference of the user 416, and the importance 406 of a node.

For example, the grouping step can depend on the output device and the connection to the output device. If the output device is a pager and the connection is of low bandwidth, more nodes should be grouped together.

This grouping process can depend on the category a node belongs to. Different types of nodes can be summarized differently. For example, if the node represents a URL link, there may not be any summarization. Another example is that a Datatable is not summarized, and a layout table will be. A Datatable can be defined as a table where (the total number of bytes in the table)/(the number of rows*the number of columns in the table) is a small number. And a layout table is one where the above equation gets a large number, such as 250. A Data table will not be further summarized, while a layout table will be.

The grouping process may depend on the user preference. Some users may want a more detailed abstract than others.

In one embodiment, for a group-level, its corresponding group-nodes should be of similar importance. One way to measure importance is to determine the size of the node based upon the amount of data it contains. If the variance across group-nodes at a group-level is low, then that group-level has been summarized.

A high variance at a group-level can imply that at least one of the group-nodes is significantly more important than other nodes, such as occupying more space. That group-node is split into smaller group-nodes, which are considered to be at the same group-level as the original group-nodes. This can be done recursively until the variance among group-nodes at the group-level is low.

For example, going down a parent node, one has five child nodes. Each child node has 200 bytes, except one has 20 kbytes. Treat the large node as the parent node, and go down that node. This is done recursively until all of the nodes are similar in size. That set of nodes would be considered as of the same level, and is assumed to be of similar importance.

In the above example, the importance of a node is based on size. But, it can be based on other characteristics, such as the number of URLs within that node or the amount of actual space on the output device occupied by the node.

Certain summarization criterion may override other criterion. For example, if the output device has a small display, such as a handheld computer, there should be a size limit to the output of the summarization step. Then even when there is a high variance at a group-level, if further subdividing the group-node exceeds the size limit, there will not be additional splitting of the group-node.

The summarized tree occupies less bandwidth than the original document. Transmitting the tree to a user requires less bandwidth, but can quickly provide the user an indication regarding information in the document.

After the grouping step, a group-node can be named. For example, a node can include five sub-nodes after grouping. One way to name that node is to pick the first word of the name of each sub-node and tie all of the first words together to generate an aggregate label or name.

Figure 7:
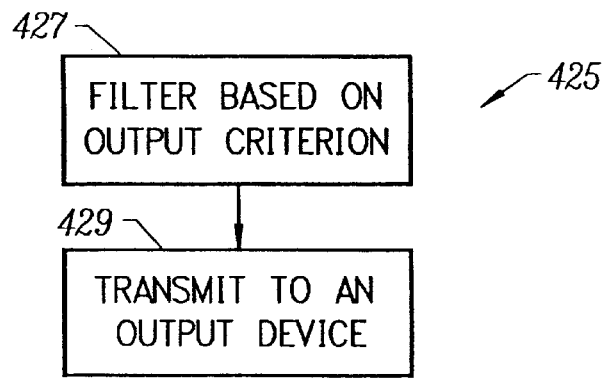
FIG. 7 shows a set of steps to prepare the summarized document to be outputted.
Figure 8:
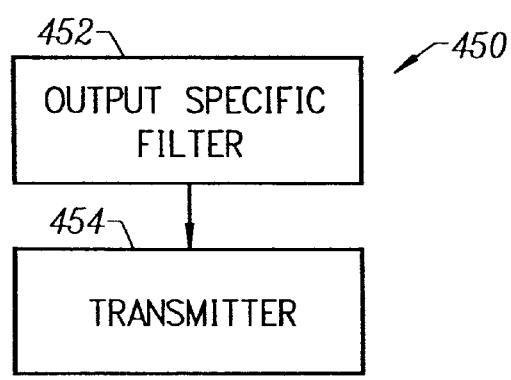
FIG. 8 shows one apparatus to implement the steps shown in FIG. 7.

FIG. 7 shows a set of steps 425 to prepare the summarized document or tree to be outputted, and FIG. 8 shows one apparatus 450 to implement the steps shown in FIG. 7. First, an output specific filter 452 filters (step 427) the summarized tree, and then a transmitter 454 transmits (step 429) the filtered tree to the output device 154.

One filter can be a personal computer, which can directly read a markup language. If the summarized tree is already in HTML, and the computer understands HTML, the summarized tree is directly sent to the computer, without any further filtering. This applies for example to a title page where one just wants to send it out.

Figure 9:
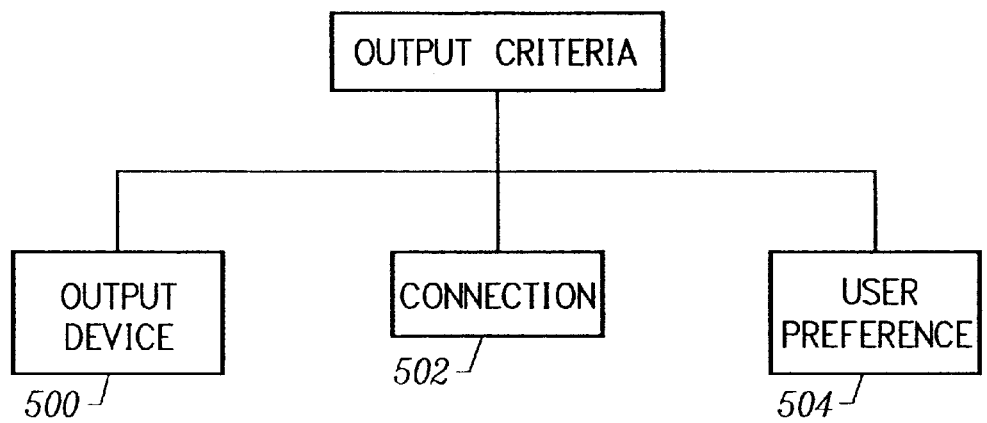
FIG. 9 shows examples of output criteria of the present invention.

FIG. 9 shows examples of output criteria the filter depends on. The output-specific filter can modify the summarized tree based on one or more characteristics of the output device 500, the connection 502 to the device and the user preference 504. For example, the output is in monochrome, then the corresponding filter changes all non-black colors into white. If the connection is of low bandwidth, then some information may be dropped, such as images. If the user wants information presented to her in bright red, with a green background, such information will be sent to the user.

In one embodiment, the abstractor statistically analyzes the document and then summarizes the document. In another embodiment, the abstractor parses the document before it is analyzed statistically. Yet in another embodiment, the analyzed document is classified before it is summarized. The classified document might also be formatted before summarization.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-aided method to generate a hyperlinked abstract from a markup language document comprising the steps of:

parsing the markup language document to generate a syntax tree with a number of nodes;

analyzing statistically the syntax tree;

generating an annotated syntax tree including collected statistical information responsive to the step of analyzing;

classifying each node into a predefined category based on the collected statistical information of the annotated syntax tree; and, summarizing the classified nodes to create a hyperlinked abstract of the document to be presented at an output device.

2. The method of claim 1 further comprising the step of adapting each node of the classified tree so that information at each classified node is in the syntax of a language that can be understood by the output device.

3. The method as recited in claim 1 wherein the markup language is HTML.

4. The method as recited in claim 1 wherein the step of summarizing depends on an input from a user.

5. The method as recited in claim 1 wherein the step of summarizing includes the step of grouping a plurality of nodes together thereby reducing the size of the annotated syntax tree.

6. The method as recited in claim 1 further comprising the step of filtering the abstract based on an output criterion.

7. The method as recited in claim 1 wherein based on the abstract, the content of the document can be re-generated.

8. An apparatus for generating a hyperlinked abstract from a markup language document comprising:
- a parser configured to parse the markup document to generate a syntax tree of the document with a number of nodes;
- a statistical analyzer configured to analyze statistically the syntax tree based on at least one rule and to generate an annotated syntax tree including collected statistical information;
- a classifier configured to classify each node into a predefined category based on the collected statistical information of the annotated syntax tree; and,
- a summarizer configured to summarize the classified nodes to create a hyperlinked abstract of the document to be presented at an output device.

9. The apparatus of claim 8 further comprising an adaptor configured to adapt each node of the classified tree so that information at each classified node is in the syntax of a language that can be understood by the output device.

10. The apparatus as recited in claim 8 wherein the markup language is HTML.

11. The apparatus as recited in claim 8 wherein the summarizer, in summarizing, depends on an input from a user.

12. The apparatus as recited in claim 8 wherein the summarizer, in summarizing, groups a plurality of nodes together thereby reducing the size of the annotated syntax tree.

13. The apparatus as recited in claim 8 further comprising a filter configured to filter the abstract based on an output criterion.

14. The apparatus as recited in claim 8 wherein based on the abstract, the content of the document can be re-generated.

15. A computer-aided method to generate a hyperlinked abstract from a markup language document comprising the steps of:
- parsing the markup language document to generate a syntax tree with a number of nodes arranged in a number of levels;
- analyzing statistically the syntax tree;
- classifying each node into a predefined category; and,
- summarizing the classified nodes to create a hyperlinked abstract of the document to be presented at an output device; wherein the step of summarizing includes reducing the number of levels of the syntax tree by grouping a plurality of nodes together.

16. The method of claim 15 further comprising the step of adapting each node of the classified tree so that information at each classified node is in the syntax of a language that can be understood by the output device.

17. The method as recited in claim 15 wherein the step of summarizing includes the step of grouping a plurality of nodes together.

18. The method as recited in claim 15 further comprising the step of filtering the abstract based on an output criterion.

19. The method as recited in claim 15 wherein based on the abstract, the content of the document can be re-generated.

20. An apparatus for generating a hyperlinked abstract from a markup language document comprising:
- a parser configured to parse the markup document to generate a syntax tree of the document with a number of nodes arranged in a number of levels;
- a statistical analyzer configured to analyze statistically the syntax tree based on at least one rule;
- a classifier configured to classify each node into a predefined category; and,
- a summarizer configured to summarize the classified nodes to create a hyperlinked abstract of the document to be presented at an output device; wherein the summarizer reduces the number of levels of the syntax tree by grouping a plurality of nodes together.

21. The apparatus of claim 20 further comprising an adaptor configured to adapt each node of the classified tree so that information at each classified node is in the syntax of a language that can be understood by the output device.

22. The apparatus as recited in claim 20 further comprising a filter configured to filter the abstract based on an output criterion.

* * * * *